US 12,480,376 B2

(12) United States Patent
Patterson et al.

(10) Patent No.: US 12,480,376 B2
(45) Date of Patent: Nov. 25, 2025

(54) WASHPIPE ASSEMBLY (71) Applicant: FORUM US, INC., Houston, TX (US)

(72) Inventors: Stephen Patterson, Westhill (GB);
Sohaib Anwer, Houston, TX (US);
Blake E. Smith, College Station, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 18/599,500

(22) Filed: Mar. 8, 2024

(65) Prior Publication Data
US 2024/0301761 A1 Sep. 12, 2024

Related U.S. Application Data (60) Provisional application No. 63/451,175, filed on Mar. 9, 2023.

(51) Int. Cl.
*F16J 15/18* (2006.01)
*E21B 33/08* (2006.01)
*F16J 15/00* (2006.01)
*F16J 15/34* (2006.01)
*F16J 15/447* (2006.01)

(52) U.S. Cl.
CPC .......... *E21B 33/085* (2013.01); *F16J 15/002* (2013.01); *F16J 15/18* (2013.01); *F16J 15/3448* (2013.01); *F16J 15/447* (2013.01)

(58) Field of Classification Search
CPC ........ F16J 15/002; F16J 15/18; F16J 15/3448; F16J 15/447; E21B 33/085
See application file for complete search history.

(56) References Cited

U.S. PATENT DOCUMENTS

| 2,470,960 | A | | 5/1949 | Tremolada | |
| 2,764,428 | A | | 9/1956 | Murphy | |
| 3,210,087 | A | | 10/1965 | Mayer | |
| 5,328,178 | A | * | 7/1994 | Nies | F16J 15/164 |
| | | | | | 277/552 |
| 6,007,105 | A | | 12/1999 | Dietle et al. | |
| 6,827,351 | B2 | * | 12/2004 | Graziani | F04B 39/041 |
| | | | | | 277/552 |
| 9,638,327 | B1 | * | 5/2017 | Banowetz | F16J 15/3284 |
| 9,726,291 | B2 | * | 8/2017 | Sonleiter | F16J 15/3212 |
| 10,094,182 | B2 | | 10/2018 | Glawion et al. | |
| 10,538,978 | B1 | * | 1/2020 | Du | E21B 21/02 |
| 2004/0035574 | A1 | | 2/2004 | Pippert | |
| 2005/0206090 | A1 | * | 9/2005 | Bunn | F16J 15/3236 |
| | | | | | 277/549 |
| 2007/0251703 | A1 | | 11/2007 | Riley et al. | |
| 2013/0299238 | A1 | * | 11/2013 | Weaver | G01M 3/02 |
| | | | | | 175/40 |

(Continued)

*Primary Examiner* — Vishal A Patel
(74) *Attorney, Agent, or Firm* — Patterson + Sheridan, LLP (57) ABSTRACT

A washpipe assembly is configured to form a fluid tight seal between a rotating and non-rotating component. The washpipe assembly has a washpipe, a static seal assembly coupled to one end of the washpipe, and a dynamic seal assembly coupled to an opposite end of the washpipe. The dynamic seal has a seal disposed within an outer housing. The seal is contained within a seal cavity formed by the outer housing and an outer diameter of the washpipe. The dynamic seal assembly is rotatable relative to the washpipe while the seal maintains sealing contact with the outer diameter of the washpipe.

5 Claims, 10 Drawing Sheets (56) References Cited

U.S. PATENT DOCUMENTS

2016/0362941 A1   12/2016  Deel
2017/0321807 A1   11/2017  Walker et al.
2018/0231432 A1*  8/2018  Deel ................... G01M 3/2815
2021/0071487 A1   3/2021  Masini et al.
2023/0235634 A1*  7/2023  West ....................... E21B 21/01

* cited by examiner

WASHPIPE ASSEMBLY

CROSS-REFERENCE TO RELATED APPLICATIONS

This application claims benefit of United States provisional patent application Ser. No. 63/451,175, filed Mar. 9, 2023, which is herein incorporated by reference.

BACKGROUND

Field

Aspects of the present disclosure relate to washpipe assemblies for use in drilling rig systems.

Description of the Related Art

A washpipe assembly is a critical component of drilling rig systems, serving as a conduit for circulating drilling fluid and removing cuttings from a wellbore. The washpipe assembly provides a fluid seal between a stationary, nonrotating component (such as a gooseneck) and a non-stationary, rotating component (such as a drill string). The washpipe assembly must maintain a fluid-tight seal to prevent the escape of drilling fluid and ensure the safe and effective operation of the drilling rig system. Current washpipe assembly designs have seals that degrade over time and require frequent replacement, which can be a time consuming process.

Therefore, there is a need for new and/or improved washpipe assembly designs that are long lasting and easy to repair and install.

SUMMARY

In one embodiment, a washpipe assembly comprises a washpipe, a static seal assembly coupled to one end of the washpipe, and a dynamic seal assembly coupled to an opposite end of the washpipe. The dynamic seal assembly comprises a seal disposed within an outer housing, wherein the seal is contained within a seal cavity formed by the outer housing and an outer diameter of the washpipe. The dynamic seal assembly is rotatable relative to the washpipe while maintaining sealing contact with the outer diameter of the washpipe.

In one embodiment, a washpipe assembly comprises an upper housing, a spring housing coupled to the upper housing, and a lower housing having a lower seal member. The spring housing comprises a biasing member that biases an upper seal member out of the spring housing and into contact with the lower seal member.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as subs, mandrels, links, etc.

Figure 1:
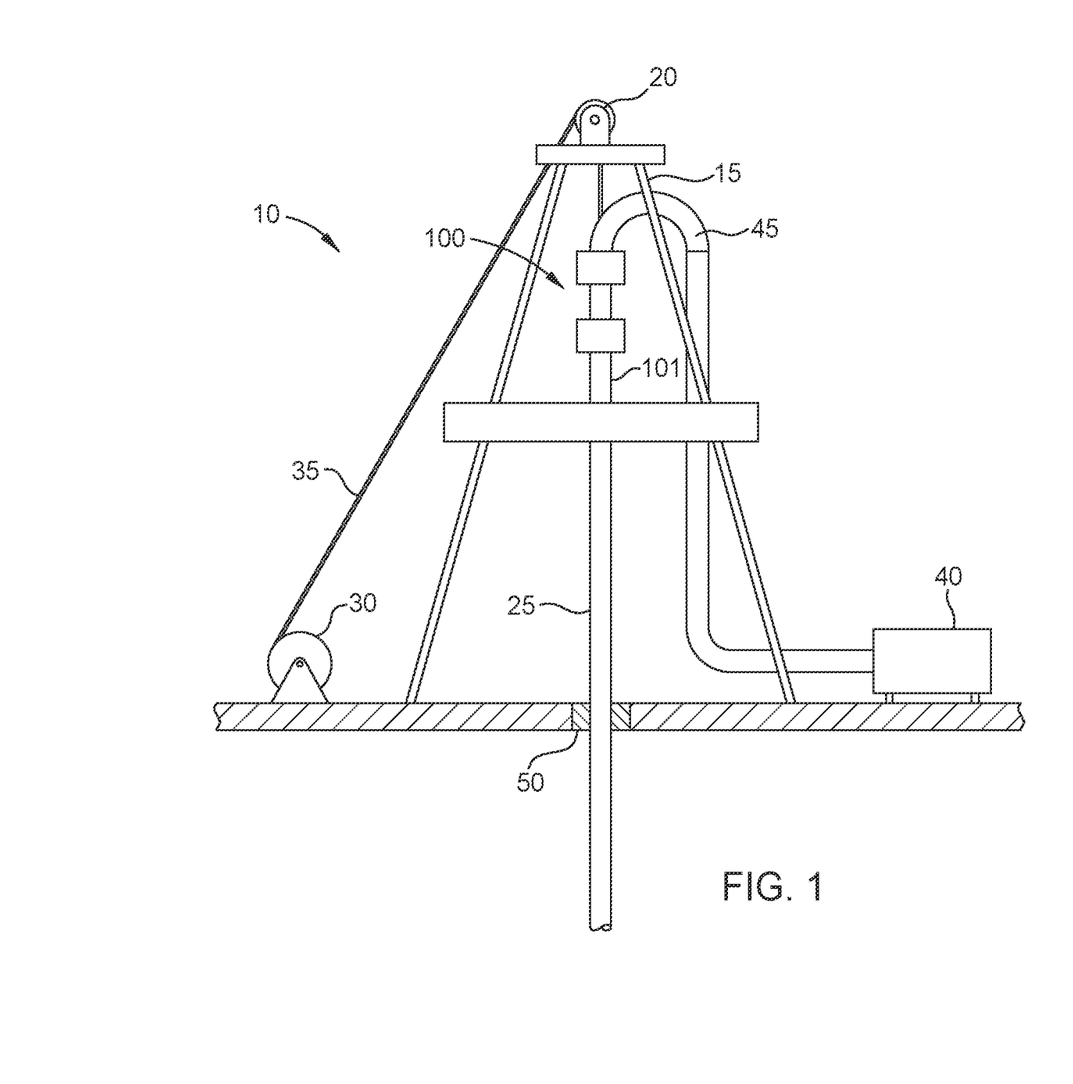
FIG. 1 is a schematic view of a drilling rig system, according to one embodiment.

FIG. 1 illustrates a drilling rig system 10, according to one embodiment. The drilling rig system 10 may include a derrick 15, which supports a crown block 20 that is used to hoist a drill string 25. The drill string 25 may be hoisted by a line 35 via a drawworks 30. The drilling rig system 10 may further include a mud processing system 40, which may include a mud pump. The mud processing system 40 may pump drilling fluid through a gooseneck 45 which is fluidly coupled to an upper end 101 of the drill string 25 by a washpipe assembly 100. The drill string 25 may be rotated by a rotary table 50 and/or by a top drive, while the gooseneck 45 remains stationary. The washpipe assembly 100 provides a fluid seal between the stationary, nonrotating gooseneck 45 and the non-stationary, rotating drill string 25.

Figure 2:
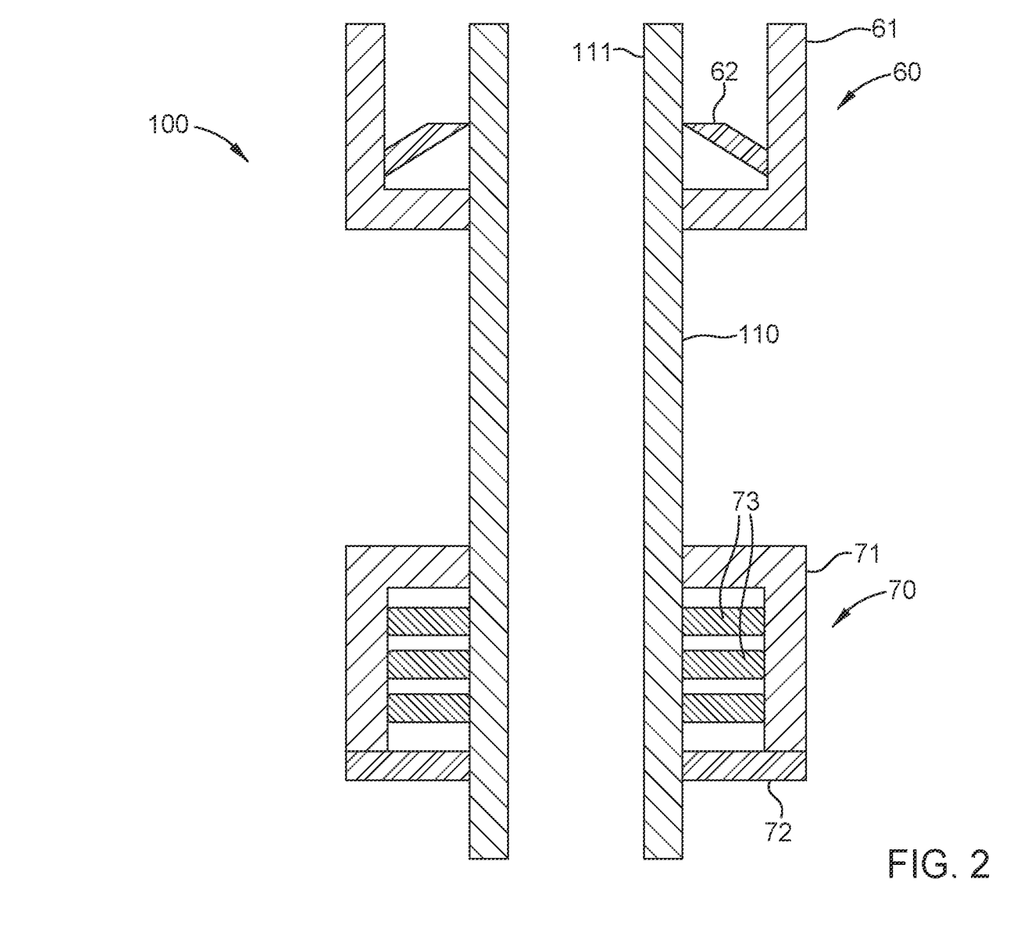
FIG. 2 is a sectional view of a washpipe assembly, according to one embodiment.

FIG. 2 is a sectional view of the washpipe assembly 100, according to one embodiment. The washpipe assembly 100 comprises a washpipe 110, which may be in the form of a tubular member, having an inner bore 111 through which fluid, such as a drilling fluid, can be pumped. The washpipe 110 is disposed between a static seal assembly 60 and a dynamic seal assembly 70. The static seal assembly 60 may comprise an outer housing 61 and a static seal 62 disposed in the outer housing 61, which seals against the outer diameter of the washpipe 110. The outer housing 61 may be coupled to the gooseneck 45 illustrated in FIG. 1 and remains stationary, along with the washpipe 110.

The dynamic seal assembly 70 may comprise an outer housing 71, a removable end cap 72 coupled to the outer housing 71, and a plurality of dynamic seals 73 disposed in the outer housing 71. The plurality of dynamic seals 73 seal against the outer diameter of the washpipe 110. The outer housing 71 may be coupled to the upper end 101 of the drill string 25 illustrated in FIG. 1 and rotates upon rotation of the drill string 25. In this manner, the dynamic seal assembly 70 rotates relative to the washpipe 110 and the static seal assembly 60, while the plurality of dynamic seals 73 maintain a seal against the outer diameter of the washpipe 110. The dynamic seal assembly 70 illustrated in FIG. 2 is just one, non-limiting example of a schematic representation of the various dynamic seal assemblies further described herein.

Figure 3:
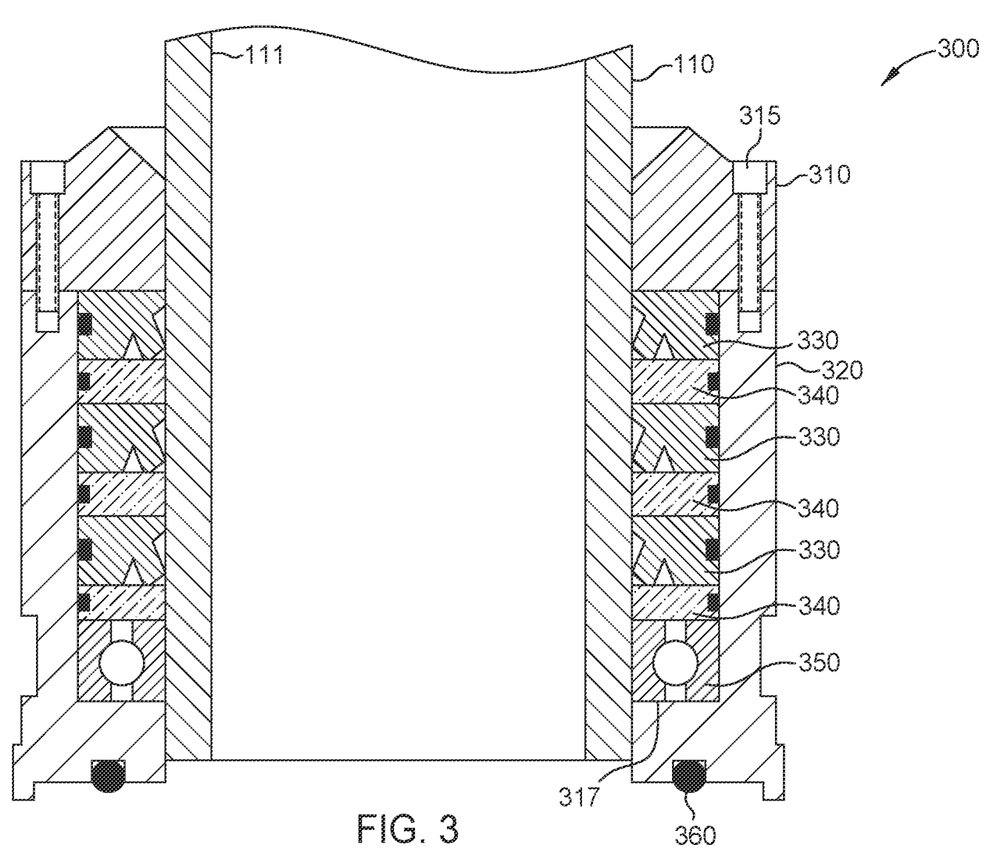
FIG. 3 is a sectional view of a dynamic seal assembly of the washpipe assembly, according to one embodiment.

FIG. 3 is a sectional view of a dynamic seal assembly 300 of the washpipe assembly 100, according to one embodiment. The dynamic seal assembly 300 comprises an outer housing 320 and a removable end cap 310 coupled to the outer housing 320 by one or more fasteners 315, such as screws. The dynamic seal assembly 300 further comprises a plurality of seals 330, such as high pressure rotary seals, and a plurality of seal support members 340 positioned below each seal 330. Although three seals 330 and three seal support members 340 are shown, the dynamic seal assembly 300 may comprise one, two, three, four, five, six, seven, eight, nine, ten, or more seals 330 and/or seal support members 340.

A bearing 350 is positioned below the seals 330 and the seal support members 340. Specifically, the bearing 350 is positioned below the last seal support member 340. The bearing 350 provides rotational support of the seals 330, the seal support members 340, and the outer housing 320 relative to the washpipe 110. The arrangement of the seals 330, the seal support members 340, and the bearing 350 can be reversed such that the bearing 350 is positioned on top, adjacent to the end cap 315, followed by one seal support member 340, one seal 330, one seal support member 340, and so forth. Alternatively, the end cap member 310 can be coupled to a lower end of the outer housing 320, or a pair of end cap members 310 can be used and coupled to both the upper and lower ends of the outer housing 320.

The end cap member 310, the outer housing 320, and the washpipe 110 form a seal cavity 317 in which the seals 330, the seal support members 340, and the bearing 350 are contained. Specifically, the seals 330, the seal support members 340, and the bearing 350 are secured in position from above by the end cap member 310. The seals 330, the seal support members 340, and the bearing 350 are secured in position from below by an inner shoulder of the outer housing 320, and on one side by the sidewall of the outer housing 320. The seals 330, the seal support members 340, and the bearing 350 are secured in position on an opposite side by the outer diameter of the washpipe 110.

The seals 330 seal against the outer diameter of the washpipe 110 and the inner diameter of the outer housing 320. The dynamic seal assembly 300 is configured to rotate relative to the washpipe 110, while the seals 330 maintain a seal against the outer diameter of the washpipe 110 and the inner diameter of the outer housing 320. An end seal 360, such as an O-ring, may be used to seal against a lower rotating component, such as the upper end 101 of the drill string 25 as illustrated in FIG. 1.

Figure 4:
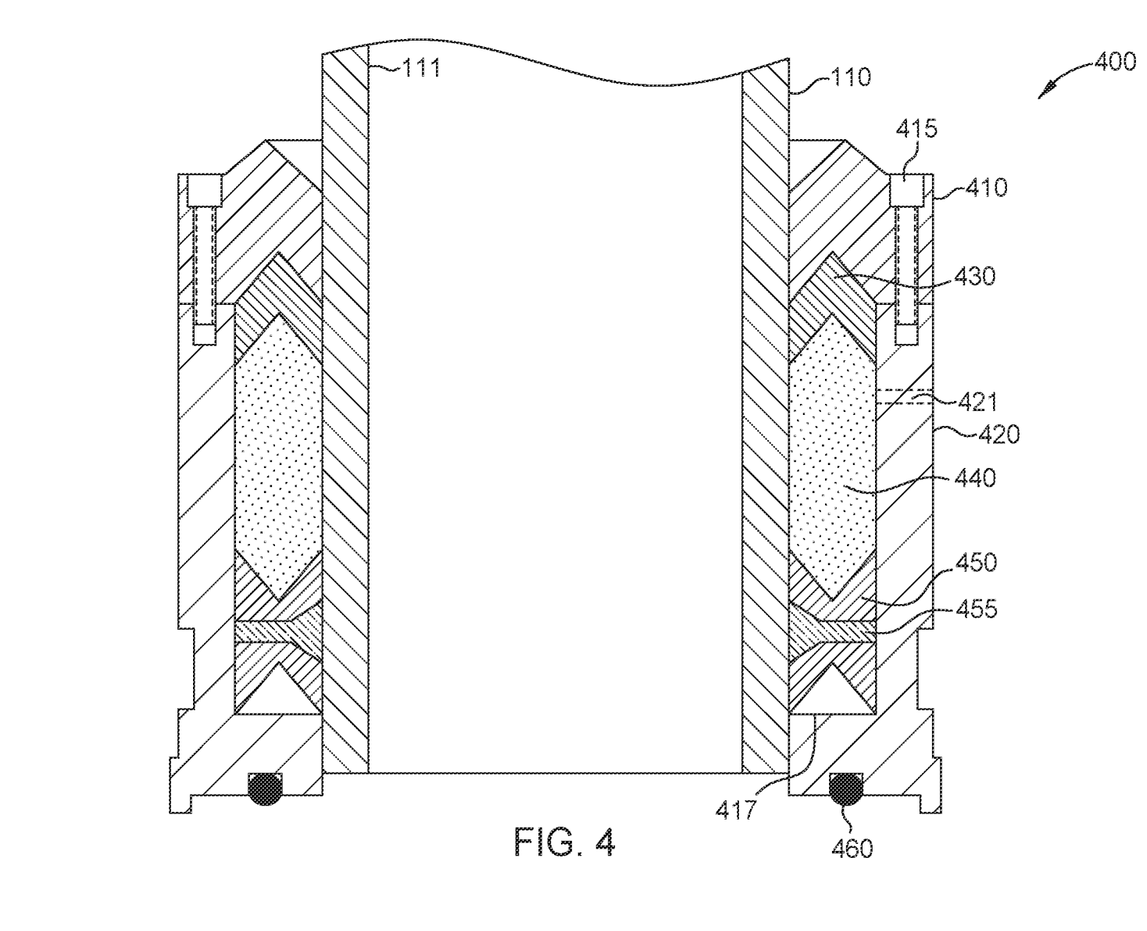
FIG. 4 is a sectional view of a dynamic seal assembly of the washpipe assembly, according to one embodiment.

FIG. 4 is a sectional view of a dynamic seal assembly 400 of the washpipe assembly 100, according to one embodiment. The dynamic seal assembly 400 comprises an outer housing 420 and a removable end cap 410 coupled to the outer housing 420 by one or more fasteners 415, such as screws. The dynamic seal assembly 400 further comprises an upper seal 430, such as a lip seal, and a lower seal 450 with a seal support member 455, such as a double edge seal with a stiffener.

A seal fluid (injectable packing) 440 is contained within an area between the upper seal 430 and the lower seal 450 from above and below. The seal fluid (injectable packing) 440 is further contained on the sides between the outer housing 420 and the outer diameter of the washpipe 110. The seal fluid (injectable packing) 440 is injected through a port 421 formed in the sidewall of the outer housing 420. The seal fluid (injectable packing) 440 energizes the seals 430, 450 to form a seal against the outer diameter of the washpipe 110 and the inner diameter of the outer housing 420. The arrangement of the seals 430, 450 can be reversed. Alternatively, the end cap member 410 can be coupled to a lower end of the outer housing 420, or a pair of end cap members 410 can be used and coupled to both the upper and lower ends of the outer housing 420.

The end cap member 410, the outer housing 420, and the washpipe 110 form a seal cavity 417 in which the seals 430, 450 and the seal fluid (injectable packing) 440 are contained. Specifically, the seals 430, 450 and the seal fluid (injectable packing) 440 are secured in position from above by the end cap member 410. The seals 430, 450 and the seal fluid (injectable packing) 440 are secured in position from below by an inner shoulder of the outer housing 420, and on one side by the sidewall of the outer housing 420. The seals 430, 450 and the seal fluid (injectable packing) 440 are secured in position on an opposite side by the outer diameter of the washpipe 110.

The seals 430, 450 seal against the outer diameter of the washpipe 110 and the inner diameter of the outer housing 420. The dynamic seal assembly 400 is configured to rotate relative to the washpipe 110, while the seals 430, 450 maintain a seal against the outer diameter of the washpipe 110 and the inner diameter of the outer housing 420. An end seal 460, such as an O-ring, may be used to seal against a lower rotating component, such as the upper end 101 of the drill string 25 as illustrated in FIG. 1.

Figure 5:
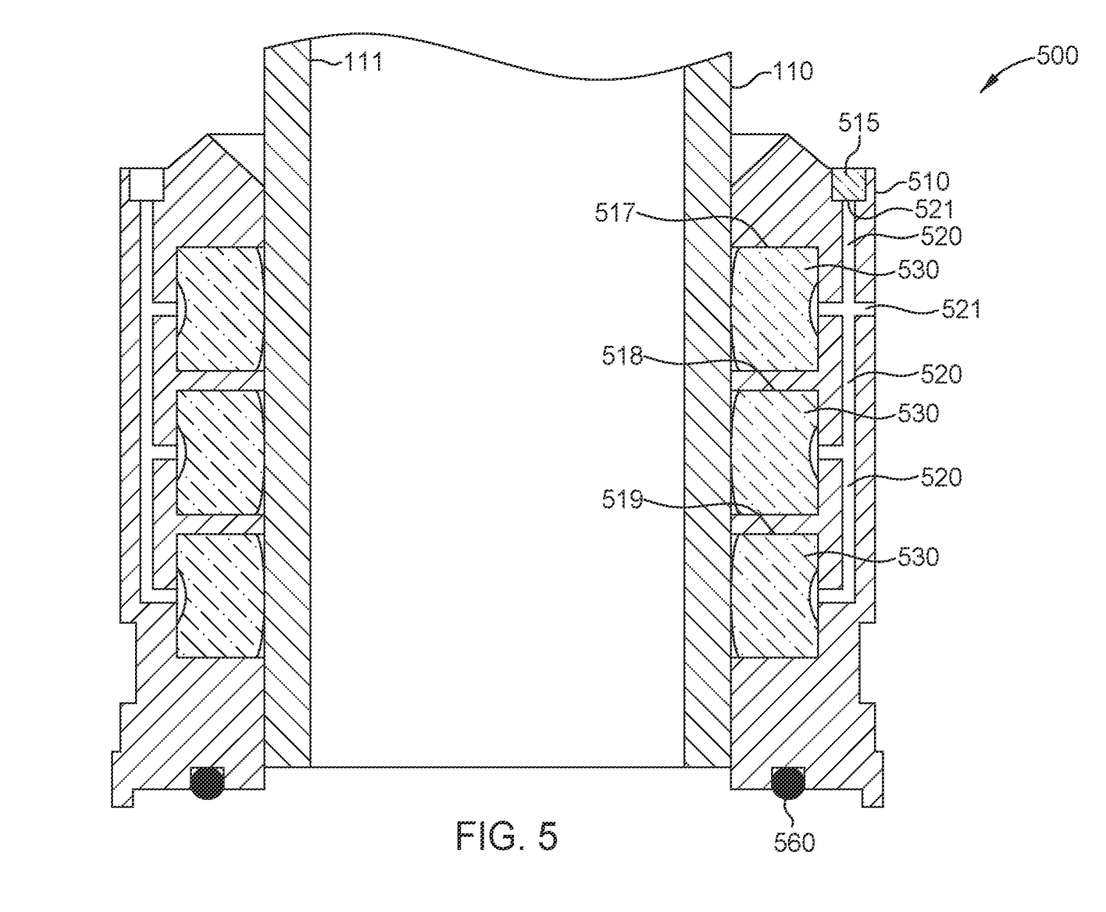
FIG. 5 is a sectional view of a dynamic seal assembly of the washpipe assembly, according to one embodiment.

FIG. 5 is a sectional view of a dynamic seal assembly 500 of the washpipe assembly 100, according to one embodiment. The dynamic seal assembly 500 comprises an outer housing 510 and a plurality of seals 530, such as high pressure rotary seals, disposed within the outer housing 510. The outer housing 510 may be in the form of a monolithic body. Although three seals 530 are shown, the dynamic seal assembly 500 may comprise one, two, three, four, five, six, seven, eight, nine, ten, or more seals 530.

Each seal 530 is located within one seal cavity 517, 518, 519 formed by the outer housing 510. Each seal cavity 517, 518, 519 is formed by inner shoulders of the outer housing 510 located above and below each seal 530, and on one side by inner sidewalls of the outer housing 510. The seals 530 are secured in position on an opposite side by the outer diameter of the washpipe 110.

A fluid, such as grease, is injected through one or more ports 521 formed in the sidewall (and top) of the outer housing 510. The fluid flows through one or more fluid paths 520 formed in the body of the outer housing 510, which direct the fluid to each seal cavity 517, 518, 519. The fluid is pumped into each seal cavity 517, 518, 519 on a side of each seal 530 that is opposite from the outer diameter of the washpipe 110. The fluid energizes the seals 530 to form a seal against the outer diameter of the washpipe 110 and the inner shoulders of the outer housing 510. The ports 521 may be plugged by one or more plug members 515 (shown in the port 521 at the top of the outer housing 510) after injection of the fluid.

The dynamic seal assembly 500 is configured to rotate relative to the washpipe 110, while the seals 530 maintain a seal against the outer diameter of the washpipe 110 and the inner surfaces of the outer housing 510. An end seal 560, such as an O-ring, may be used to seal against a lower rotating component, such as the upper end 101 of the drill string 25 as illustrated in FIG. 1.

Figure 6:
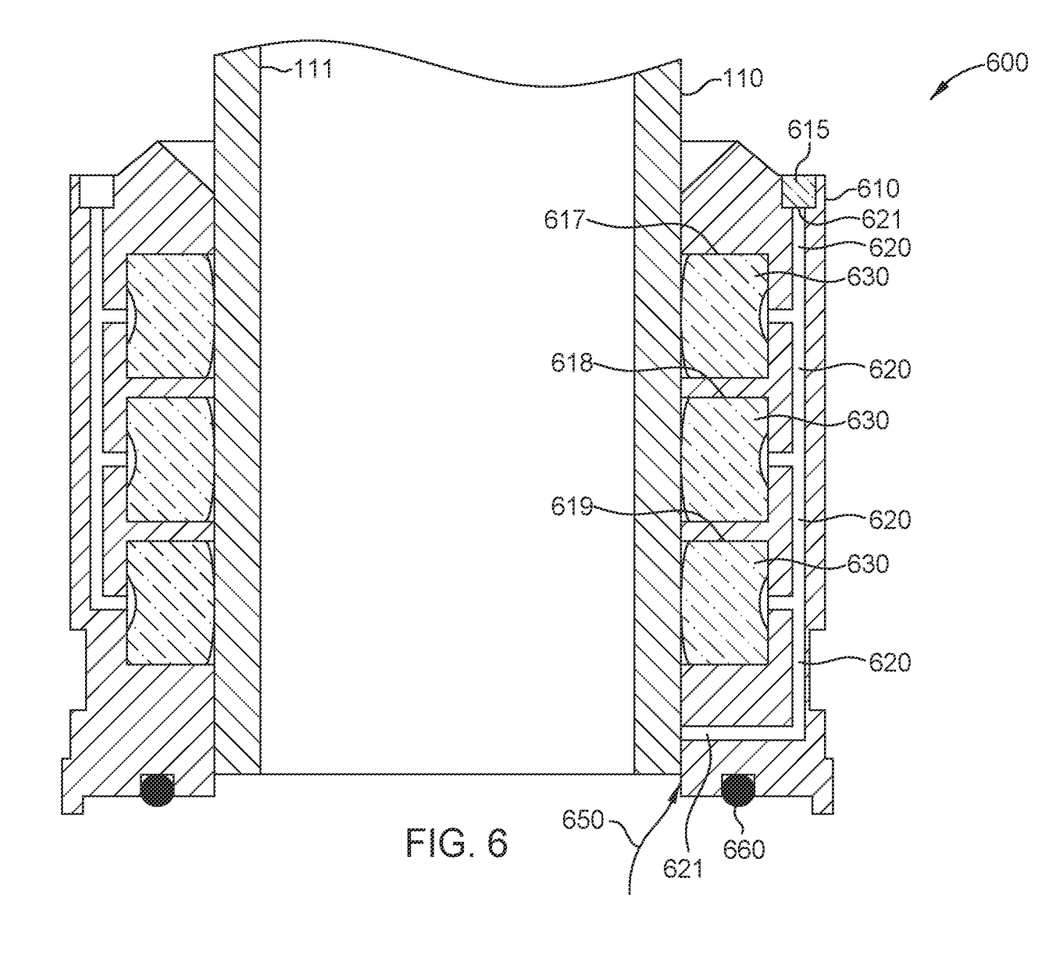
FIG. 6 is a sectional view of a dynamic seal assembly of the washpipe assembly, according to one embodiment.

FIG. 6 is a sectional view of a dynamic seal assembly 600 of the washpipe assembly 100, according to one embodiment. The dynamic seal assembly 600 has a similar arrangement as the dynamic seal assembly 500. The components of the dynamic seal assembly 600 that are the same as the dynamic seal assembly 500 are labeled with the same base number but with a 600-series reference number. A full description of each component will not be repeated for brevity.

The primary difference between the dynamic seal assembly 600 and the dynamic seal assembly 500 is the location of the port 621. In the dynamic seal assembly 500, the port 521 is located on the outer diameter (and top) of the outer housing 510, whereas in the dynamic seal assembly 600, the port 621 is located on the inner diameter (and top) of the outer housing 610. Specifically, the port 621 is located below all of the seals 630 so that a fluid 650 (such as a drilling fluid) that flows through the inner bore 111 of the washpipe 110, can be the fluid that energizes the seals 630. The dynamic seal assembly 600 is configured to be self-energizing and does not require a separate or an additional fluid to be injected externally through the outer housing 610.

In one embodiment, the dynamic seal assembly 600 may have the port 621 individually going through the shoulders that are separating the seals 619, 618, 617. This would result in pressurizing the lower most seal first and only upon its failure would it energize the next seal above it.

Figure 7:
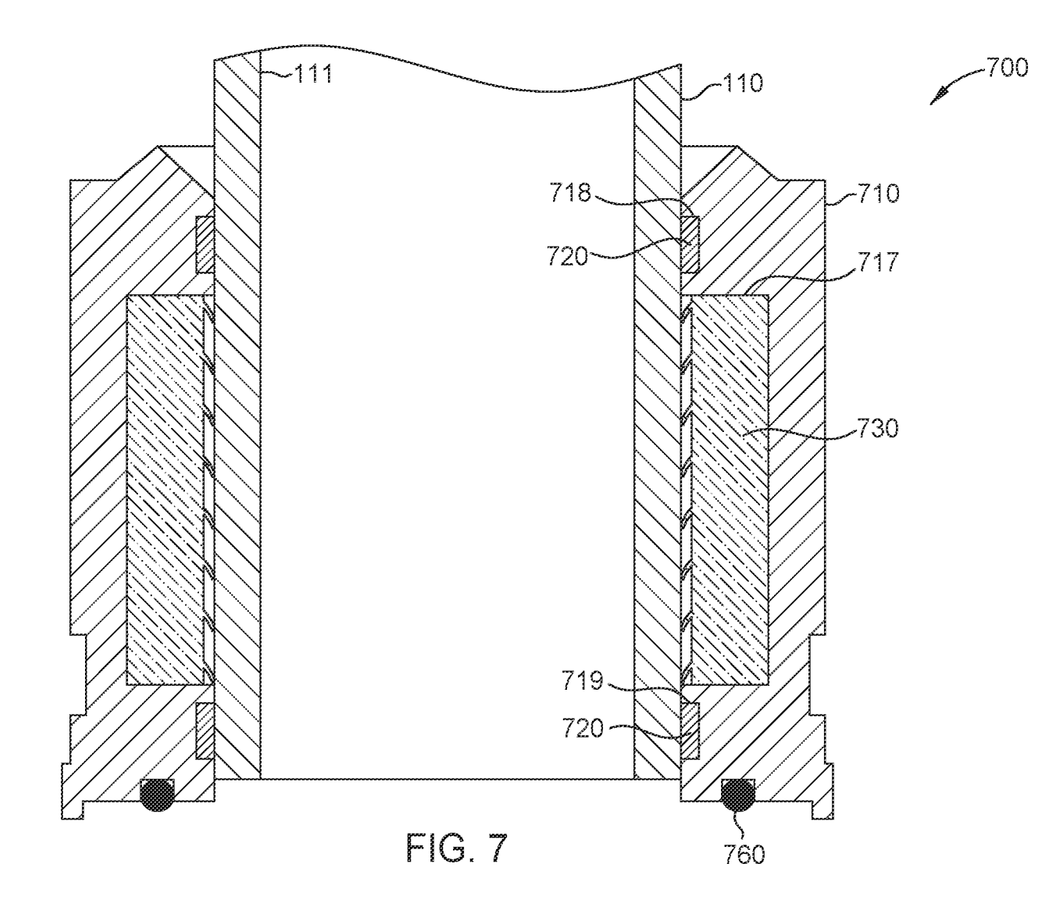
FIG. 7 is a sectional view of a dynamic seal assembly of the washpipe assembly, according to one embodiment.

FIG. 7 is a sectional view of a dynamic seal assembly 700 of the washpipe assembly 100, according to one embodiment. The dynamic seal assembly 700 comprises an outer housing 710 and a seal 730, such as a labyrinth seal, disposed within the outer housing 710. The seal 730 may be a single seal member. The outer housing 710 may be in the form of a monolithic body.

The seal 730 is located within a seal cavity 717 formed by the outer housing 710. The seal cavity 717 is formed by inner shoulders of the outer housing 710 located above and below the seal 730, and on one side by the inner sidewall of the outer housing 710. The seal 730 is secured in position on an opposite side by the outer diameter of the washpipe 110.

A pair of bearings or bushings 720 are disposed in recesses 718, 719, respectively, formed in the inner diameter of the inner shoulders of the outer housing 710. The bearings or bushings 720 are positioned above and below the seal 730 and the seal cavity 717, and engage the outer diameter of the washpipe 110. The bearings or bushings 720 provides rotational support of the seal 730 and the outer housing 710 relative to the washpipe 110.

The seal 730 seals against the outer diameter of the washpipe 110 and the inner diameter of the outer housing 710. The dynamic seal assembly 700 is configured to rotate relative to the washpipe 110, while the seal 730 maintains a seal against the outer diameter of the washpipe 110 and the inner diameter of the outer housing 710. An end seal 760, such as an O-ring, may be used to seal against a lower rotating component, such as the upper end 101 of the drill string 25 as illustrated in FIG. 1.

Figure 8:
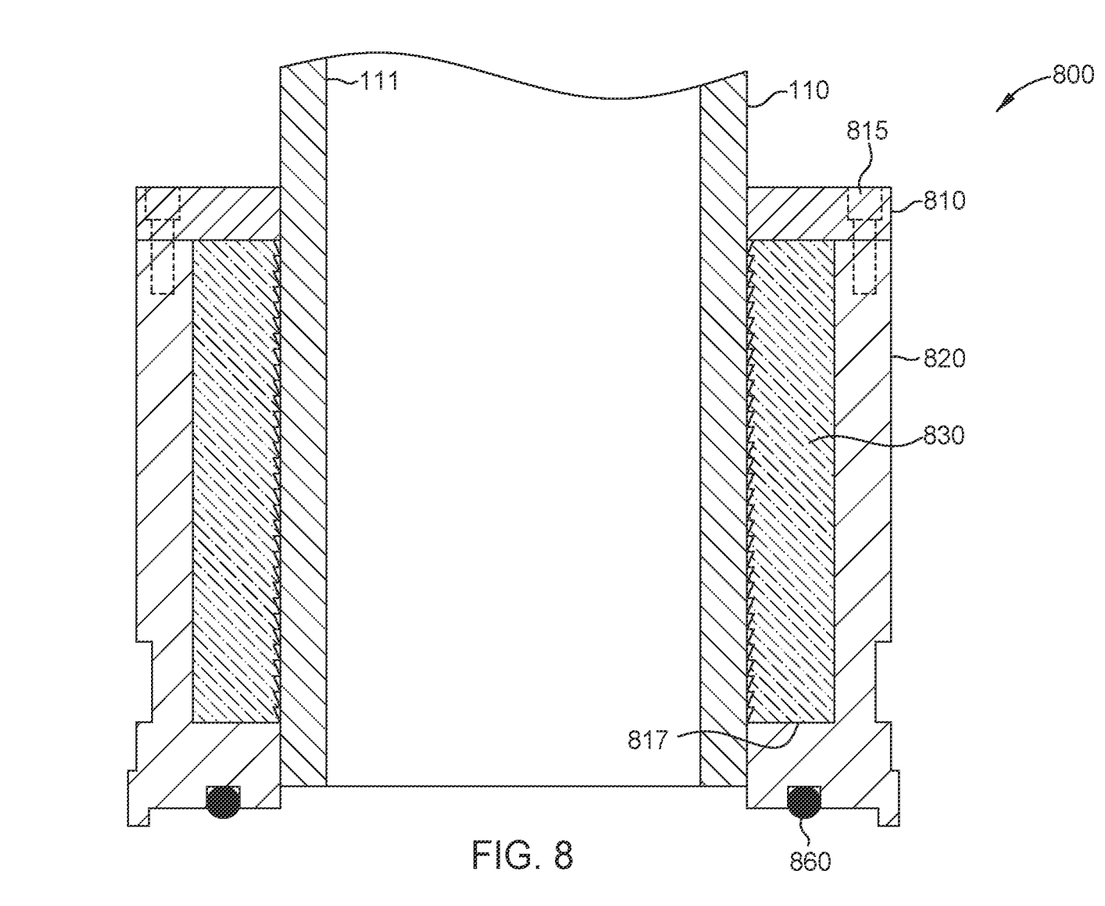
FIG. 8 is a sectional view of a dynamic seal assembly of the washpipe assembly, according to one embodiment.

FIG. 8 is a sectional view of a dynamic seal assembly 800 of the washpipe assembly 100, according to one embodiment. The dynamic seal assembly 800 comprises an outer housing 820 and a removable end cap 810 coupled to the outer housing 820 by one or more fasteners 815, such as screws. A seal 830, such as a multi-lip molded seal or a removable seal, is disposed within the outer housing 820. The seal 830 may be a single seal member. The end cap member 810 can be coupled to a lower end of the outer housing 820, or a pair of end cap members 810 can be used and coupled to both the upper and lower ends of the outer housing 820.

The end cap member 810, the outer housing 820, and the washpipe 110 form a seal cavity 817 in which the seal 830 is contained. Specifically, the seal 830 is secured in position from above by the end cap member 810. The seal 830 is secured in position from below by an inner shoulder of the outer housing 820, and on one side by the inner sidewall of the outer housing 820. The seal 830 is secured in position on an opposite side by the outer diameter of the washpipe 110.

In one embodiment, the dynamic seal assembly 800 may incorporate the bearings or bushings 720 as described in the dynamic seal assembly 700.

The seal 830 seals against the outer diameter of the washpipe 110 and the inner diameter of the outer housing 820. The dynamic seal assembly 800 is configured to rotate relative to the washpipe 110, while the seal 830 maintains a seal against the outer diameter of the washpipe 110 and the inner diameter of the outer housing 810. An end seal 860, such as an O-ring, may be used to seal against a lower rotating component, such as the upper end 101 of the drill string 25 as illustrated in FIG. 1.

Figure 9:
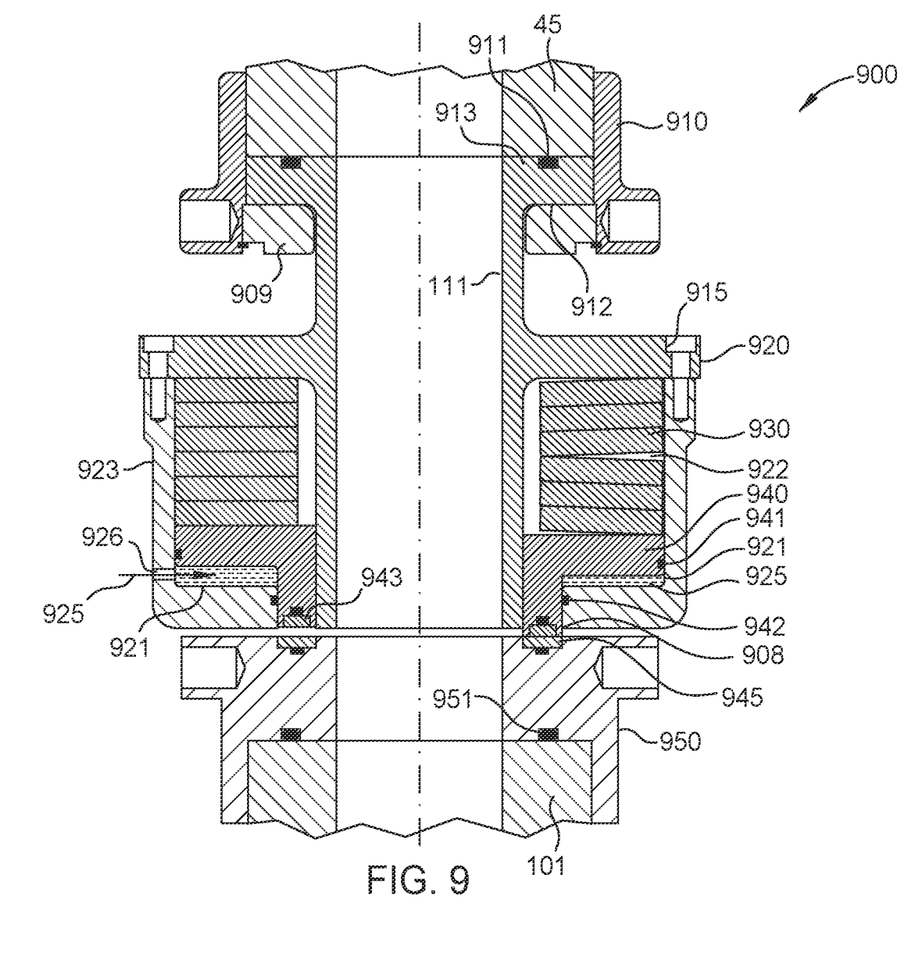
FIG. 9 is a sectional view of a washpipe assembly, according to one embodiment.

FIG. 9 is a sectional view of a washpipe assembly 900, according to one embodiment. The right side of the sectional view of FIG. 9 illustrates the washpipe assembly 900 in a sealed position, and the left side of the sectional view of FIG. 9 illustrates the washpipe assembly 900 in an un-sealed position.

The washpipe assembly 900 comprises an upper housing 910 coupled to a spring housing 920. The spring housing 920 comprises an upper end having an outer shoulder 913 that engages an inner shoulder 912 of the upper housing 910 (and/or a lower end cap 909 coupled to the upper housing 910). A seal 911, such as an O-ring, may be disposed in a top surface of the outer shoulder 913 of the spring housing 920. The seal 911 forms a seal between the spring housing 920 and an upper component, such as the gooseneck 45 illustrated in FIG. 1.

A lower end section 923 of the spring housing 920 may be coupled to the spring housing 920 by one or more fasteners 915, such as screws or bolts. A biasing member 930, such as a spring, is disposed within a cavity 922 of the spring housing 920. An upper seal member 940 is also disposed within the cavity 922 of the spring housing 920 adjacent to the biasing member 930. A lower end of the upper seal member 940 extends out of the cavity 922 of the spring housing 920 (such as out of an opening 908 formed in or adjacent a bottom of the lower end section 923 of the spring housing 920). Seals 941, 942, such as O-rings, are disposed between outer diameter portions of the upper seal member 940 and inner diameter portions of the spring housing 920. A chamber 921 is formed within the cavity 922 of the spring housing 920, specifically between the outer walls of the upper seal member 940 and the inner walls of the spring housing 920. The chamber 921 is sealed by the seals 941, 942.

The biasing member 930 biases the lower end of the upper seal member 940 out of the spring housing 920 and into contact with a lower seal member 945, which is coupled to a lower housing 950. The lower housing 950 may be coupled to a lower component, such as the upper end 101 of the drill string 25 so that the lower housing 950 rotates with the drill string 25. A seal 951, such as an O-ring, may be disposed in a bottom surface of an inner shoulder of the lower housing 950. The seal 951 forms a seal between the lower housing 950 and the upper end 101 of the drill string 25 illustrated in FIG. 1.

The lower housing 950 rotates (with the drill string 25) relative to the spring housing 920. A dynamic seal is formed by the contact between the lower end of the upper seal member 940, which remains stationary, and the lower seal member 945, which rotates. The biasing member 930 forces the lower end of the upper seal member 940 out of the spring housing 920 and into contact with the lower seal member 945 to maintain the dynamic seal. The upper seal member 940 itself may be formed out of a material configured to seal with the lower seal member 945, or an additional seal material 943 may be coupled to the upper seal member 940 which contacts the lower seal member 945 to form the dynamic seal. The dynamic seals prevents leakage of fluid when flowing from the gooseneck 45 to the drill string 25 through the inner bore 111 of the washpipe assembly 900.

With reference to the left side of FIG. 9, to remove the dynamic seal or before the dynamic seal is required, a fluid 925 can be pumped into the chamber 921 via a port 926 formed in the sidewall of the spring housing 920. The fluid 925 is pumped at a pressure sufficient to move the upper seal member 940 against the bias force of the biasing member 930, thereby compressing the biasing member 930. The upper seal member 940 is moved away from the lower housing 950 and out of contact with the lower seal member 945. When the dynamic seal is needed, the fluid 925 can be removed from the cavity or the pressure of the fluid 925 in the cavity can be reduced to a pressure sufficient to allow the biasing member 930 to force the upper seal member 940 into contact with the lower seal member 945.

Figure 10:
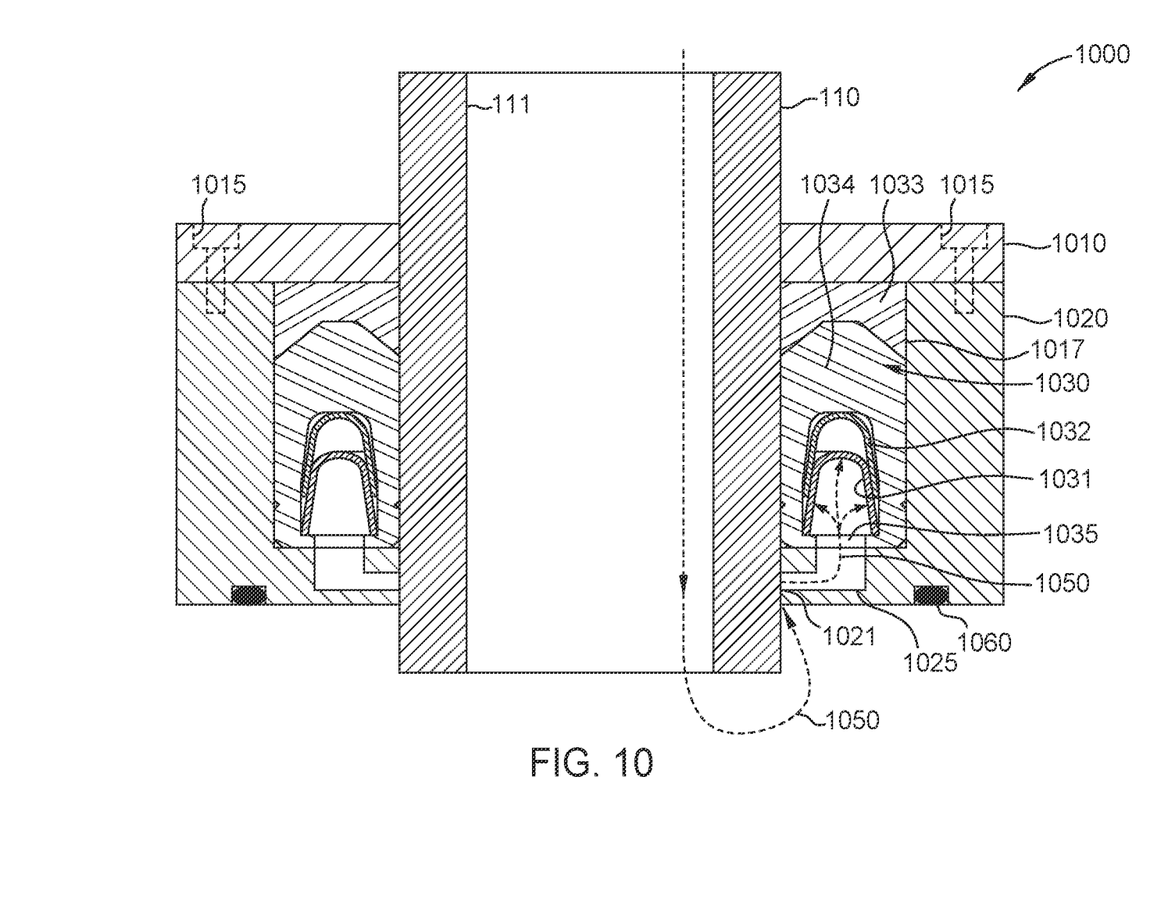
FIG. 10 is a sectional view of a dynamic seal assembly of the washpipe assembly, according to one embodiment.

FIG. 10 is a sectional view of a dynamic seal assembly 1000 of the washpipe assembly 100, according to one embodiment. The dynamic seal assembly 1000 comprises an outer housing 1020 and a removable end cap 1010 coupled to the outer housing 1020 by one or more fasteners 1015, such as screws. The end cap member 1010 can similarly be coupled to a lower end of the outer housing 1020, or a pair of end cap members 1010 can be used and coupled to both the upper and lower ends of the outer housing 1020.

A seal 1030, such as a fluid/spring energized seal, is disposed within the outer housing 1020. The seal 1030 may comprise a seal support member 1033 positioned above a seal member 1034, and a pair of spring members 1031, 1032 disposed within the seal member 1034. The seal support member 1033 may be formed out of a material (e.g. polyetheretherketone) that is harder than the material which the seal member 1034 is formed out of (e.g. plastic). The spring members 1031, 1032 may be formed out of metal. The spring members 1031, 1032 may be U-cup shaped springs. Although two spring members 1031, 1032 are shown, the seal 1030 may comprise only one spring member, or three, four, five, six, seven, eight, nine, ten, or more spring members 1031, 1032. Although only one seal 1030 is shown, two, three, four, five, six, seven, eight, nine, ten, or more seals 1030 may be disposed within the outer housing 1020 and stacked on top of each other.

The end cap member 1010, the outer housing 1020, and the washpipe 110 form a seal cavity 1017 in which the seal 1030 is contained. Specifically, the seal 1030 is secured in position from above by the end cap member 1010. The seal 1030 is secured in position from below by an inner shoulder of the outer housing 1020, and on one side by the inner sidewall of the outer housing 1020. The seal 1030 is secured in position on an opposite side by the outer diameter of the washpipe 110.

A fluid 1050, such a drilling fluid, flows through the inner bore 111 of the washpipe 110 and up into one or more ports 1021 formed in a sidewall of the outer housing 1020. The fluid 1050 flows through one or more fluid paths 1025 formed in the body of the outer housing 1020, which direct the fluid 1050 into the seal cavity 1017. The fluid 1050 then flows through one or more ports 1035 formed in the seal member 1034, and into and/or against an inner surface of the spring member 1031. The fluid 1050 energizes the seal 1030 by forcing one or both of the spring members 1031, 1032 radially outward, which forces the seal member 1034 radially outward to form a seal against the outer diameter of the washpipe 110 and the inner diameter or sidewall of the outer housing 1020. The seal support member 1033 helps retain the seal member 1034 within the outer housing 1020.

The dynamic seal assembly 1000 is configured to be self-energizing and does not require a separate or an additional fluid to be injected externally through the outer housing 1020. The dynamic seal assembly 1000 is configured to rotate relative to the washpipe 110, while the seal 1030 maintains a seal against the outer diameter of the washpipe 110 and the inner diameter of the outer housing 1010. An end seal 1060, such as an O-ring, may be used to seal against a lower rotating component, such as the upper end 101 of the drill string 25 as illustrated in FIG. 1.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

The invention claimed is:

1. A washpipe assembly, comprising:
   a washpipe;
   a static seal assembly coupled to one end of the washpipe; and
   a dynamic seal assembly coupled to an opposite end of the washpipe, wherein the dynamic seal assembly comprises:
   an outer housing;
   a seal disposed within the outer housing, wherein the seal is contained within a seal cavity formed by the outer housing and an outer diameter of the washpipe;
   a removable end cap member coupled to the outer housing which forms an upper portion of the seal cavity;
   a seal support member disposed in the seal cavity above the seal;
   a spring member disposed within the seal, wherein a port is formed in the seal to provide fluid communication to an inner surface of the spring member, wherein the dynamic seal assembly is rotatable relative to the washpipe while the seal maintains sealing contact with the outer diameter of the washpipe; and wherein the seal cavity is at least partially formed by an inner shoulder of the outer housing, and wherein one or more fluid paths are disposed through the inner shoulder of the outer housing to provide fluid communication to the seal cavity and the port of the seal.

2. The washpipe assembly of claim 1, wherein the seal comprises a fluid-spring energized seal.

3. The washpipe assembly of claim 1, wherein the washpipe comprises an inner bore which provides fluid communication with the one or more fluid paths disposed through the inner shoulder of the outer housing.

4. A washpipe assembly, comprising:
a washpipe;
a static seal assembly coupled to one end of the washpipe; and
a dynamic seal assembly coupled to an opposite end of the washpipe, wherein the dynamic seal assembly comprises:
an outer housing;
a seal cavity formed by a cavity in the outer housing and an outer diameter of the washpipe;
a seal disposed within the outer housing, wherein the seal is contained within the seal cavity;
a removable end cap member coupled to the outer housing which forms an upper portion of the seal cavity;
a seal support member disposed in the seal cavity adjacent to the seal; and
a spring member disposed within the seal, wherein the seal is contained within a seal cavity formed by the outer housing and an outer diameter of the washpipe, wherein a port is formed in the seal to provide fluid communication to an inner surface of the spring member, wherein the seal cavity is at least partially formed by an inner shoulder of the outer housing, and wherein one or more fluid paths are disposed through the inner shoulder of the outer housing to provide fluid communication to the seal cavity and the port of the seal, and wherein the dynamic seal assembly is rotatable relative to the washpipe while the seal maintains sealing contact with the outer diameter of the washpipe.

5. The washpipe assembly of claim 4, wherein the washpipe comprises an inner bore which provides fluid communication with the one or more fluid paths disposed through the outer housing.

* * * * *